Jan. 4, 1966  K. HEHL  3,227,859
TEMPERATURE REGULATING SYSTEM
Filed July 12, 1963  3 Sheets-Sheet 1
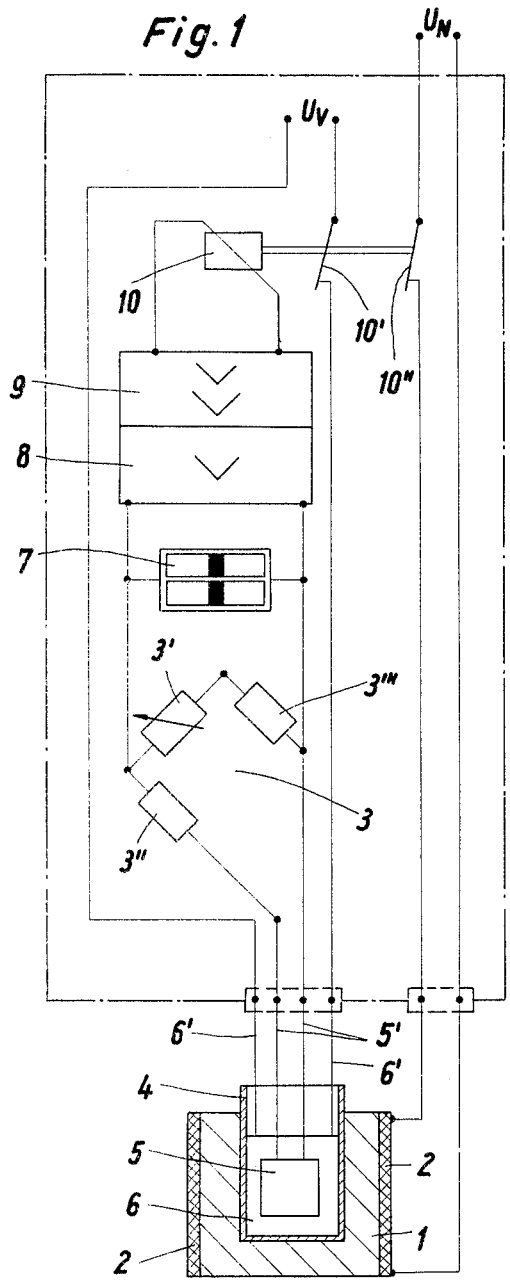
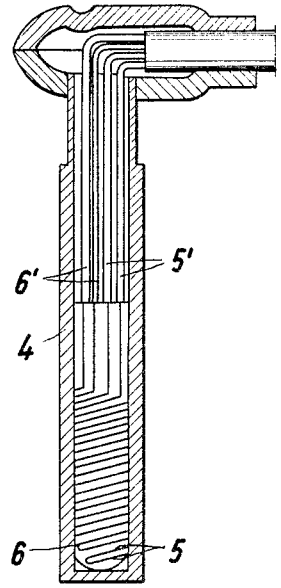
Inventor:
Karl Hehl
By: Spencer & Kaye
Attorneys

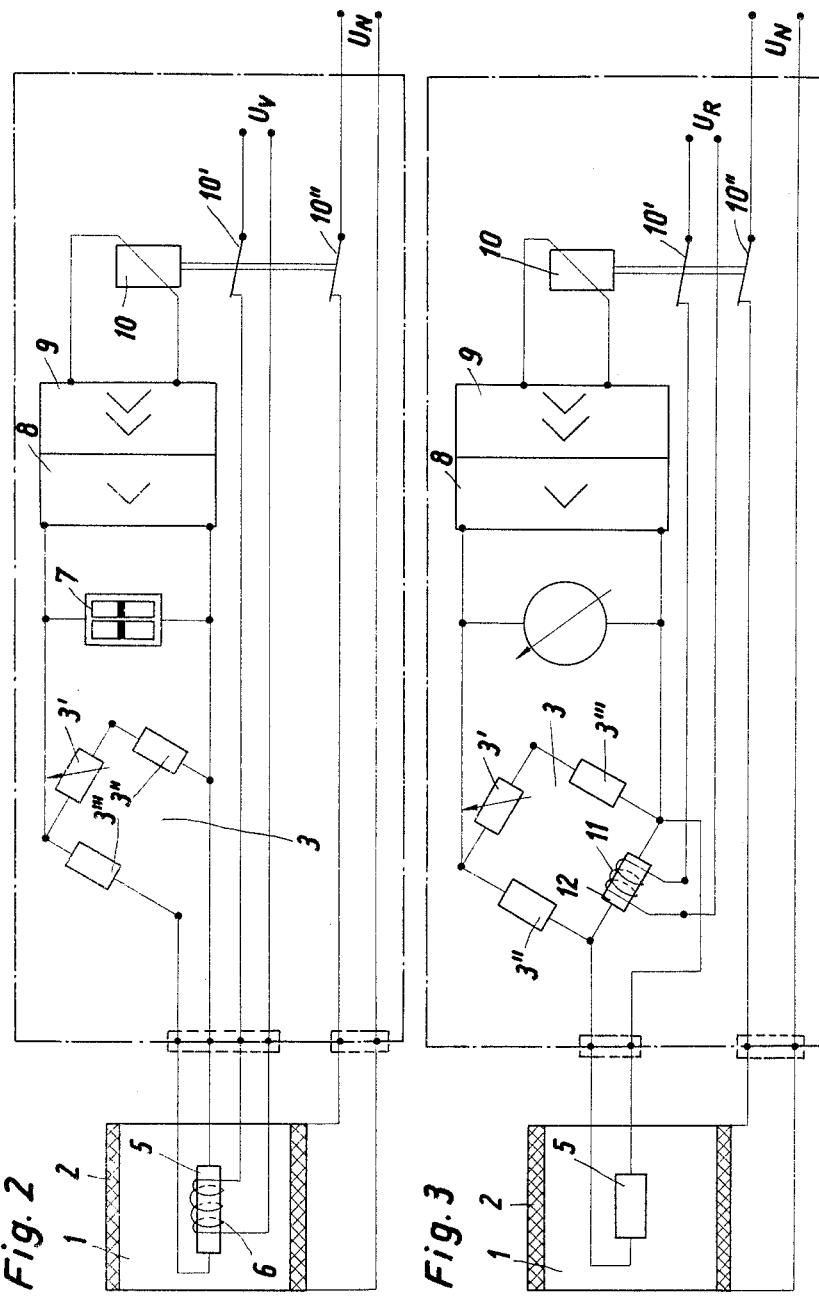

United States Patent Office 3,227,859
Patented Jan. 4, 1966

3,227,859
TEMPERATURE REGULATING SYSTEM
Karl Hehl, Lossburg, Wurttemberg, Germany, assignor to Arburg Feingerätefabrik o.H.G., Hehl & Söhne, Lossburg, Wurttemberg, Germany
Filed July 12, 1963, Ser. No. 294,468
Claims priority, application Germany, Oct. 16, 1962,
A 41,397
10 Claims. (Cl. 219—499)

The present invention relates generally to the regulating art, and, more particularly, to a temperature regulator which provides a control so that the temperature will not go beyond that to which the arrangement is set.

As the temperature sensing element a temperature dependent resistor is arranged in a bridge circuit. The temperature dependent resistor actuates a circuit element, such as a relay, by means of an electronic pre-amplifier upon a deviation of the temperature which is sensed from the temperature which is desired. It switches on or turns off the heating current of the heating element according to whether the deviation is a plus or a minus and along with this resistor an auxiliary resistor is actuated synchronously with the main current by means of the circuit element.

Thus, a temperature regulating device having a compensating arrangement in the form of an auxiliary heating arrangement is known per se, and such a regulator device is operated in dependence upon the temperature of the sensing device and by means of the same circuit element by which the main heating device is also controlled.

The objects of the present invention are to provide a simple heat regulating device which is more consistent, permits the process to pass through a narrower range of in correcting itself to the desired value, and provides rapid correction of the temperature.

These objects and others ancillary thereto are accomplished according to preferred embodiments of the invention wherein a sensing resistor is used in place of thermoelements which had previously been used and the sensing element is especially constructed in conjunction with an auxiliary heating device. In an arrangement of this type the auxiliary resistor is electrically insulated and in proximity to the sensing resistor and heats the sensing resistor with a small thermal time constant in comparison to the heating element. By this means a complete compensation is provided.

One feature of the invention is provided by connecting the sensing resistor and the auxiliary pilot resistor onto a common support and having them slightly spaced from each other.

A further feature of the invention provides a pilot resistor and a sensing resistor which are coil-shaped or helically coiled within each other and/or about each other without touching. In this manner, the temperature of the pilot resistor can be directly effective upon the sensing resistor.

In accordance with a further feature of the invention, the support may be a cylindrical insulating body onto which the coils are wound around each other and fused or melted or embedded into the body, this body being sealingly provided with a metallic feeler sleeve having a high heat conductivity. For optical temperature control an indicating tube may be provided having a fluorescent surface provided with positive and negative indicating regions or ranges.

In accordance with the present invention the disadvantage of having a resetting magnitude at a chosen temperature value which is to be manually compensated is avoided because the temperature range at the object to be regulated causes an immediate change of the temperature of the pilot resistor. By this means the heating power produced by the pilot resistor is provided with a continuous matching of the given value over the entire temperature range.

Additional objects and advantages of the present invention will become apparent upon consideration of the following description when taken in conjunction with the accompanying drawings in which:

FIGURE 1 is a schematic view of one arrangement of the present invention and illustrating a circuit diagram for use with the resistor elements.

FIGURE 2 is a schematic view of a slightly modified construction of the present invention.

FIGURE 3 is a schematic view of the circuit connection by temperature regulator which is known.

FIGURE 4 is a sectional view illustrating the structural unit including the pilot resistor, the sensing resistor, and the support therefor.

Figure 5:
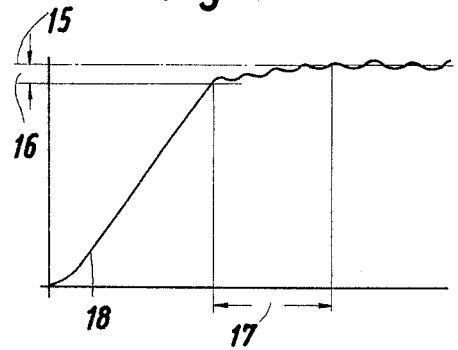
FIGURES 5, 5a and 5b are graphs showing the temperature curves produced by a known temperature regulator of a type generally similar to the present invention during regulation and with respect to different desired values.

With more particular reference to the drawings, FIGURES 1 and 2 show schematic views of the construction and of the circuit of the regulator of the present invention and which differ from each other in the sensing resistor 5 housed in the object to be regulated as well as in the pilot resistor 6 which is used.

The regulated object, that is, the object or specimen whose temperature is to be regulated, is disposed in a heating sleeve 2 which surrounds the regulated object. The measuring or heat-sensing resistor 5 is disposed adjacent the pilot heating resistor 6. The elements are shown schematically in FIGURES 1 and 2 but the actual constructional details of the resistor elements for FIGURE 1 are shown in FIGURE 4. The sensing resistor 5 and heating resistor 6 are connected to a structural unit on a common support. These elements are arranged to cooperate with one another by winding the sensing resistor 5 and the heating resistor 6 helically into each other and/or about each other upon a cylindrical insulating body. In this coiled arrangement the helically arranged resistor wires of the sensing resistor and of the heating resistor are wound about each other but without actually touching each other. These resistors are embedded in the insulating body which is constructed of glass or ceramic material. The unit which is formed by the support, the sensing resistor 5, and the heating resistor 6 is sealingly enclosed by a metallic feeler or sensing tube 4.

The sensing resistor and the heating resistor are provided with contacts or connection points 5' and 6', respectively. The sensing sleeve 4 is embedded in the regulated object 1 in a sealed manner. The voltage $U_N$ of the mains is fed to the heating sleeve 2 by means which are controlled by relay contact 10" of relay 10. The heating resistor 6 is fed with transformed low voltage $U_V$ by means which are controlled by the relay contact 10' of relay 10. The sensing resistor 5 is connected into the regulating circuit which is defined by the resistor bridge 3, the indicating tube 7, the pre-amplifier 8, the relay amplifier 9, and the switching relay 10.

The resistor bridge 3 includes a component 3' which may be adjusted to provide the desired temperature value. The resistor bridge 3 also includes two bridge resistors 3" and 3'''. The indicating tube 7 has two indicating regions which are a positive range to indicate when the rated temperature has been surpassed, and a negative range for indicating when the temperature falls short of the rated value. Different fluorescent regions of the indicating tube optically indicate when the value is surpassed or when the magnitude falls short of this value.

In the operation of the regulating system, it is assumed that a certain temperature of the regulated object is, for example, 100° C. as a starting point and then a desired value of 110° C. is set using the adjustable resistor 3'. Since the bridge is thus changed from its equilibrium condition, temperature regulation is carried out by means of the pre-amplifier 8, the relay amplifier 9 and the relay 10. The bridge is unbalanced because of the new desired value which has been set and consequently the regulating circuit is closed by the relay and the heating resistor heats up to the newly set desired value in an extremely short period of time. This heating is sensed by the sensing resistor 5 which is in close heat-exchange arrangement with the heating resistor and thus resistor 5 also reaches the rated value. However, at the time that the sensing resistor attains the desired temperature, the bridge of elements 3', 3", 3''', is balanced again and the circuits of the regulator are thus interrupted.

In the period of time between actuating and deactuating of the regulator circuit, the regulated object itself has been provided with a relatively minor temperature increase, for example, from 100° C. to 103° C. Therefore, in the regulated object there is still a temperature deficit of 7° C. from the desired value, which has been newly set, of 110° C.

Since the sensing resistor 5 and the heating resistor 6 are in intensive heat-exchange arrangement with the regulated object 1 by means of the metallic feeler sleeve 4, the temperature in the unit which includes the sensing resistor and the heating resistor decreases very quickly to the temperature of the regulated object 1, that is, down to 103° C. The conseqeunce of this is that the resistor bridge again becomes unbalanced and the regulating circuit as well as the heating current circuit is closed by means of the relay 10.

The pilot heating resistor 6 and therefore also the sensing resistor 5 are once again heated to the desired value. In this second heating up process the temperature difference between the desired value and the actual value of the regulated object is smaller and the pilot resistor and sensing resistor reach the desired temperature more quickly than was the case in the first heating process. After the heating current circuit and the regulating circuit have been opened because the desired value has been attained in both the pilot and the sensing resistors, another cooling off period of the pilot resistor and the sensing resistor down to the temperature of the regulated object takes place. The regulated object has been heated up by a small amount but is still below the desired temperature value. The above-mentioned temperature matching or balancing between the sensing resistor, the pilot heating resistor, and the regulated object again takes place more quickly because the temperature difference between the desired value and the regulated object has become smaller.

When the temperature of the pilot resistor and of the sensing resistor has been reduced to the temperature of the regulated object 1, the bridge is again unbalanced and the heating up cycle starts again. It can thus be seen that these heating up periods become progressively shorter, as the temperature of the regulated object approaches the desired value.

In the above-explained process of heating up and cooling down it is important that there is no appreciable surpassing of the desired value taking place. This is true for regulating to desired values at a lower temperature as well as for regulating to desired values in a higher temperature range. In no event is an RC member required as an impulse producer as was necessary in previously used conventional systems.

Figure 6:
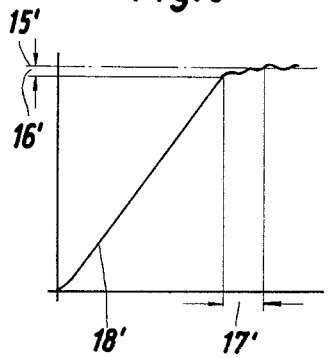
FIGURES 6, 6a and 6b are graphs showing the temperature curves produced by the temperature regulator of the present invention with respect to different desired values.
Figure 6A:
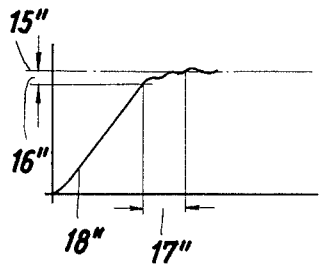
Figure 6B:
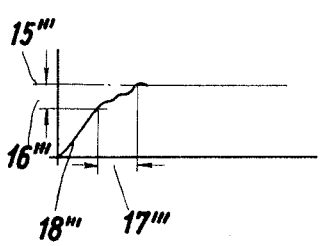

The characteristic of the heating up process of the temperature regulator comprising the present invention is illustrated in FIGURES 6, 6a and 6b, in a coordinate system. The desired value 15' is relatively high in FIGURE 6, and is very low in FIGURE 6b, where it is indicated as 15'''. The temperature curves 18', 18", and 18''', are shown during the periods of time 17', 17", and 17''' within which the regulator operates periodically, that is, with the heating up process being interrupted. The temperature regulator so to speak "feels" toward the desired value limit. In this manner because of the automatic adjustment of the value of the object to be regulated, a uniform control of the desired value is attained.

The given value 16', 16" and 16''' is different depending upon the level of the desired value. In the relatively low desired value shown in FIGURE 6b, the given range 16''' is relatively large. In the relatively high desired value in FIGURE 6, the given range 16' is relatively small.

FIGURE 3 illustrates the construction and circuit diagram of a previously common temperature regulator of a type which is comparable to that of the present invention. Assuming in this regulator that the starting temperature in the regulated object is 103° C. and the desired value is set to be 110° C., then a heating up of the restoring resistor 12 will take place via element 11 and the bridge will become balanced and the regulating circuit interrupted. The cooling off of the restoring resistor which now takes place in a relatively slow manner is dependent upon many incalculable variable factors, such as air currents, heat accumulation, etc. at the restoring resistor. Thus, the heating up characteristics in this regulator result in the curves known per se and which are shown in FIGURES 5, 5a and 5b.

Figure 5A:
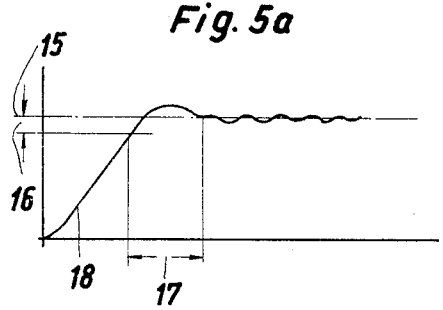
Figure 5B:
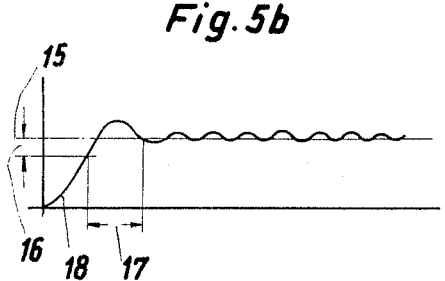

Since the restoring value 16 which is a constant value has been set at a medium magnitude as shown in FIGURE 5a, the temperature value which is desired is then considerably surpassed at a low desired value level according to FIGURE 5b. On the other hand, the time period for a desired value to be reached is extraordinarily long when the desired value is set at a high magnitude as shown in FIGURE 5. Thus the temperature regulation during the regulating period is unsatisfactory. Insofar as an RC impulse regulator is used, it is necessary to reset this regulator constantly in accordance with the desired value because when the restoring magnitude has the same value at low desired values, there is a surpassing of the temperature, and at higher values, there is a delay in attaining the desired temperature, or, under certain circumstances, the desired temperature can no longer be reached when great heat dissipation occurs.

Furthermore, the construction of the present invention of resistor elements provides considerable simplification because the restoring resistor in the resistor bridge which had heretofore been required is eliminated. The sensing resistor and the pilot heating resistor are combined into one resistor unit.

In many areas of the regulation art and especially in the regulating art for injection molding machines for processing thermoplastic materials, a better control of temperature regulation in the plasticizing cylinder is becoming more and more desirable, particularly as the quality of the moldings which are produced depends to a great extent upon an accurate temperature control. These features are rendered more desirable because the variety of the plastics to be processed becomes larger and larger. In many cases it is necessary to process thermoplastic materials which can be handled only within very narrow temperature ranges and which react to temperature variations by changing their structure. The temperature regulator of the present invention thus provides particularly in the above-mentioned field of application, a considerable advance in the art because it is suitable to enlarge the range of application of injection molding machines and to improve their qualitative output.

In the regulation art for injection molding machines the heating sleeve 2, which surrounds the thermo-regulated plasticizing cylinder, corresponds with the heating element 2 mentioned above. The sensing sleeve 4, in which the sensing resistor 5 and the heating resistor 6 are sealingly enclosed, has a high heat conductivity, for example, the heat conductivity of chromium alloy steel and is embedded in a bore of the plasticizing cylinder. In certain cases the plasticizing cylinder has two or three different zones of temperature and a corresponding number of sensing sleeves 4 each of which is a part of a temperature regulator.

The pilot resistor 6 is connected with current by the circuit member in synchronism with the connection of current to the heating sleeve 2. The sensing resistor 5 is heated by the pilot resistor 6 with a thermal time constant which is small as compared to the regulated object 1. The "thermal time constant" is defined as the time during which the temperature reaches 63% of the final temperature. This is to say that in a fixed time unit during which current flows through the heating sleeve 2 and the pilot resistor 6, the temperature in the resistor 6 and in the sensing element 5 increases more rapidly than in the regulated object 1, which is heated by the heating sleeve 2. For a distinct regulated object the transformed low voltage $U_V$ for the heating resistor 6 is adjusted only once for all further use.

In the regulation of injection molding machines of middle size for processing thermoplastic materials of middle irritability the $U_V$ voltage may lie in a range between 10–50 volts or 30–130Ω of the heating resistor 6 whereby the regulation of temperature is performed with highest precision in a wide range of used voltage-values or ohm-values.

For a regulated object of relatively great mass and relatively high specific heat (specific heat=quantity of heat in calories which warms 1 g. of a body or substance from 14.5° C. to 15.5° C.), there are to be preferred the lower values. On the other hand relatively high $U_V$ voltage causes small heating periods before reaching the desired value of temperature.

Such small periods are preferably used by processing the most delicate thermoplastic materials because small heating periods before reaching the desired values of temperature assures also the smallest surpassing of the desired value of temperature.

It will be understood that the above description of the present invention is susceptible to various modifications, changes and adaptations, and the same are intended to be comprehended within the meaning and range of equivalents of the appended claims.

What is claimed is:

1. A temperature regulator, comprising, in combination: bridge circuit means having a temperature sensing element which is a temperature dependent resistor to be positioned in the vicinity of an object which is to be temperature controlled for responding to a temperature of the object which deviates from a desired temperature; a heating element for disposition adjacent to the object to be heated for heating the same when current flows through the heating element; amplifier means controlled by deviations of the temperature dependent resistor and the bridge circuit means; a circuit member responsive to said amplifier means for selectively switching on and switching off the current to the heating element in accordance with whether there is a plus or minus to the deviation; and an auxiliary resistor connected with current by the circuit member in synchronism with the connection of current to said heating element, said auxiliary resistor being arranged in proximity to the sensing element and electrically insulated therefrom for heating the sensing element with a thermal time constant which is small as compared to the regulated object, said temperature dependent resistor and said auxiliary resistor being disposed one about the other on a common support in the form of an insulating body, and a metallic feeler sleeve of high heat conductivity surrounding said body in a sealing manner.

2. A temperature regulator, comprising, in combination: an object to be temperature regulated; a bridge circuit having a temperature sensing resistor which is temperature dependent and positioned near said object for responding to temperatures which deviate from a desired temperature; a heating element disposed adjacent to the object for heating it when current flows therethrough; an electronic pre-amplifier controlled by deviations of the temperature sensing resistor; a circuit member responsive to said electronic pre-amplifier for selectively switching on and switching off the heating current to the heating element in accordance with whether there is a plus or minus to the deviation; and an auxiliary resistor which is connected by the circuit member in synchronism with connection of current to the heating element, said auxiliary resistor being arranged in proximity to the sensing resistor in an electrically insulated manner for heating the sensing resistor with a thermal time constant which is small as compared to the heating element, said circuit member being a relay and said heating element and said auxiliary resistor being connected with current by contacts of the relay.

3. A temperature regulator, comprising, in combination: an object to be temperature regulated; a bridge circuit having a temperature sensing resistor which is temperature dependent and positioned near said object for responding to temperatures which deviate from a desired temperature; a heating element disposed adjacent to the object for heating it when current flows therethrough; an electronic pre-amplifier controlled by deviations of the temperature sensing resistor; a circuit member responsive to said electronic pre-amplifier for selectively switching on and switching off the heating current to the heating element in accordance with whether there is a plus or minus to the deviation; and an auxiliary resistor which is connected by the circuit member in synchronism with connection of current to the heating element, said auxiliary resistor being arranged in proximity to the sensing resistor in an electrically insulated manner for heating the sensing resistor with a thermal time constant which is small as compared to the heating element, said sensing resistor and said auxiliary resistor being united on a common support and being separated from each other, the auxiliary resistor and the sensing resistor being helical.

4. A regulator as defined in claim 3 wherein said resistors are wound into each other in such a manner that they do not touch each other.

5. A regulator as defined in claim 3 wherein said resistors are wound about each other in such a manner that they do not touch each other.

6. A regulator as defined in claim 3 wherein said support is a cylindrical body of insulating material and the coils are wound one about the other and are connected to the body; and comprising a metallic feeler sleeve of high heat conductivity, surrounding said body in a sealing manner.

7. A regulator as defined in claim 6 wherein the coils are fused to the body.

8. A regulator as defined in claim 6 wherein the coils are embedded into the body.

9. A temperature regulator, comprising, in combination: an object to be temperature regulated; a bridge circuit having a temperature sensing resistor which is temperature dependent and positioned near said object for responding to temperatures which deviate from a desired temperature; a heating element disposed adjacent to the object for heating it when current flows therethrough; an electronic pre-amplifier controlled by deviations of the temperature sensing resistor; a circuit member responsive to said electronic pre-amplifier for selectively switching on and switching off the heating current to the heating element in accordance with whether there is a plus or minus to the deviation; and an auxiliary resistor which is connected by the circuit member in synchronism with connection of current to the heating element, said auxiliary resistor being arranged in proximity to the sensing resistor in an electrically insulated manner for heating the sensing resistor with a thermal time constant which is small as compared to the heating element, an indicating tube being provided for optical temperature indication having a fluorescent surface provided with positive and negative indicating regions.

10. A temperature regulator, comprising, in combination: bridge circuit means having a temperature sensing element which is a temperature dependent resistor to be positioned in the vicinity of an object which is to be temperature controlled for responding to a temperature of the object which deviates from a desired temperature, said bridge circuit means having one resistor each in three of its arms and having only said temperature dependent resistor in its fourth arm; a heating element for disposition adjacent to the object to be heated for heating the same when current flows through the heating element; amplifier means controlled by deviations of the temperature dependent resistor and the bridge circuit means; a circuit member responsive to said amplifier means for selectively switching on and switching off the current to the heating element in accordance with whether there is a plus or minus to the deviation; and an auxiliary resistor connected with current by the circuit member in synchronism with the connection of current to said heating element, said auxiliary resistor being arranged in proximity to the sensing element and electrically insulated therefrom for heating the sensing element with a thermal time constant which is small as compared to the heating element, said temperature dependent resistor and said auxiliary resistor being united on a common support and being separated from each other, said support being a body of insulating material and said resistors having coils wound one about the other and being connected to the body, and a metallic feeler sleeve of high heat conductivity surrounding said body in a sealing manner.

References Cited by the Examiner
UNITED STATES PATENTS

| | | | |
|---|---|---|---|
| 2,280,257 | 4/1942 | Pearson | 338—23 |
| 2,685,627 | 8/1954 | Ehret et al. | 338—24 |
| 2,866,067 | 12/1958 | Dolan et al. | 219—511 |
| 2,954,479 | 8/1960 | Cibelius | 219—501 |
| 3,040,157 | 6/1962 | Hukee | 219—501 |
| 3,041,437 | 6/1962 | Carissimi | 219—511 |
| 3,051,815 | 8/1962 | Hukee | 219—499 |

ANTHONY BARTIS, *Acting Primary Examiner.*

RICHARD M. WOOD, *Examiner.*

L. H. BENDER, *Assistant Examiner.*